Nov. 26, 1968 G. METZGER ET AL 3,413,153
FUEL CELLS CONTAINING AQUEOUS PERFLUOROCARBOXYLIC ACID
BETWEEN HYDROPHOBIC ELECTRODES
Filed Sept. 29, 1964
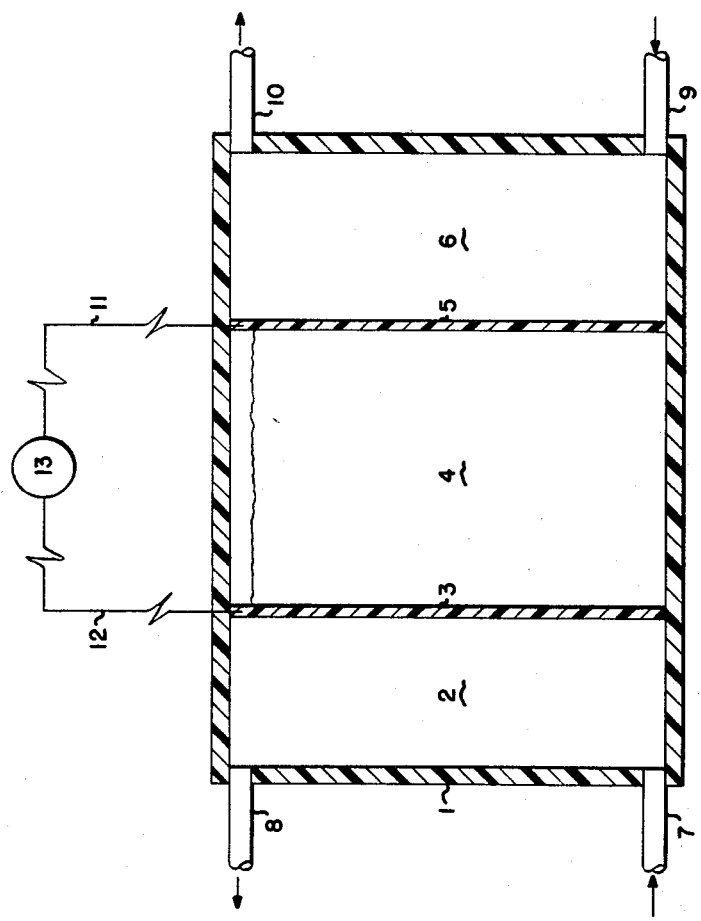
Gershon Metzger
Hugh H. Horowitz    Inventors
David J. C. Yates
By  *Henry Berk*    Patent Attorney United States Patent Office 3,413,153
Patented Nov. 26, 1968

3,413,153
FUEL CELLS CONTAINING AQUEOUS PERFLUO-ROCARBOXYLIC ACID BETWEEN HYDROPHO-BIC ELECTRODES
Gershon Metzger and Hugh H. Horowitz, Elizabeth, and David J. C. Yates, Westfield, N.J., assignors to Esso Research and Engineering Company, a corporation of Delaware
Filed Sept. 29, 1964, Ser. No. 400,117
2 Claims. (Cl. 136—86)

ABSTRACT OF THE DISCLOSURE

In a fuel cell, use of an aqueous perfluorocarboxylic acid miscible with water between hydrophobic electrodes in producing electricity by anodic oxidation of a fuel immiscible with said electrolyte gives efficient contact of fuel and electrolyte with the anode.

---

This invention relates to a new and improved method of operating an electrochemical cell for the production of electricity by the anodic oxidation of a fuel. In particular, this invention relates to a method of operating a fuel cell utilizing a liquid fuel and an aqueous electrolyte in conjunction with a hydrophobic electrode. More particularly, this invention is directed to a fuel cell utilizing an electrolyte immiscible fuel and an aqueous perfluoro acid electrolyte in conjunction with a hydrophobic electrode.

Heretofore, a problem has beset the art of operating a fuel cell utilizing both an aqueous electrolyte and an immiscible fuel. The problem was how to bind the electrode catalyst into a porous mass which will prevent electrolyte flow into the fuel chamber and yet maintain a large three-phase contact area. To accomplish this end, fine particles of polymeric binders were used. In order to secure adequate thermal and oxidative stability, polymers containing fluorine or saturated hydrocarbon chains are often used as binders. Such polymers are extremely hydrophobic and thereby very effective at preventing flow of aqueous electrolyte through the structure. In certain circumstances, however, this hydrophobicity is detrimental to the activity of the electrode. Such circumstances include the case where the fuel is a liquid hydrocarbon, which tends to wet the hydrophobic electrode thereby completely excluding the electrolyte, and rendering the electrode inefficient. Another case is where the catalyst itself is hydrophobic thereby again excluding the electrolyte.

It has now been found that the efficiency of a fuel cell can be greatly increased when the electrode is excessively hydrophobic or when a liquid hydrocarbon is used as the fuel if a particular electrolyte is used. Heretofore, the electrolytes for use in fuel cells have either been basic in nature, one of the mineral acids, mixtures of mineral acids or acetic acid. It has now been found that perfluorocarboxylic or perfluorosulfonic acids will function as extremely efficient electrolytes when used in a cell having hydrophobic electrodes and utilizing a liquid hydrocarbon as the fuel and an oxygen-containing gas as the oxidant.

In the practice of this invention, two electrodes which divide a fuel cell into three compartments are utilized. The central compartment of the three compartments contains the perfluoro acids so that each electrode has one of its sides in contact with the perfluoro acid and a second side in contact with one of the reactants. That is, the anode will contact the fuel and the acid and the cathode will contact the oxidant and the acid.

The electrodes which can be used in the performance of this invention include hydrophobic electrodes which have a water contact angle of greater than 85°. Such electrodes include those which contain the polymers of tetrafluoroethylene, acrylonitrile, dichlorodifluoroethylene, ethylene-propylene, ethylene-butylene, and halogenated copolymers of ethylene-propylene, ethylene-butylene, and propylene-butylene. Asbestos which has been waterproofed by treatment with a chlorosilane can also be used as the material with a water contact angle of greater than 85°. The electrodes can be made by coating a hydrophobic material with an electrically conductive material or by mixing the hydrophobic material with an electrically conductive material, pressing the mixture into shape and then treating so as to render the shaped material porous. The electrodes, of course, can be coated or impregnated with a catalyst either during or after their manufacture.

The electrically conductive materials of this invention include finely divided carbon, metals or mixtures of carbon and metals or doped semiconductors. The metals which can be used can either be the noble metals or the transition base metals which are not attacked by the electrolyte. It is, of course, obvious that one skilled in the art can select as the electrically conductive material one which will also act as a catalyst in a fuel cell.

As catalysts for use in conjunction with this invention, one can use any of the art-recognized materials which will function as the catalyst in the anodic oxidation of a liquid hydrocarbon. As examples of such compounds, there may be identified materials such as noble metals, transition metals, mixtures of noble and transition metals, compounds of both noble and transition metals, mixtures of the metals with the compounds of the metals, mixtures of the compounds of the metals and mixtures of noble metals.

The liquid fuels which can be used in the practice of the instant invention include liquid hydrocarbons such as the $C_5$ to $C_{30}$ alkanes and the $C_5$ to $C_{30}$ alkanes. As specific examples of the liquid fuels which may be used in this invention, there are included the straight chain compounds and the iso compounds of pentane, hexane, heptane, octane, nonane, decane, undecane, dodecane, tridecane, tetradecane, pentadecane, hexadecane, heptadecane, nonadecane, eicosane, heneicosane, decosane, tricosane, tetracosane, pentacosane, hexacosane, heptacosane, octacosane, nonacosane, triacontane and the corresponding unsaturated monoenes, dienes and trienes.

Reference is now made to the accompanying drawing which is for the purpose of illustration only.

The drawing is a schematic pictograph of a fuel cell having a casing 1, a fuel compartment 2, an anode 3, an electrolyte compartment 4, a cathode 5, and an oxidant compartment 6. Fuel is admitted into the cell through conduit 7 and waste products and excess fuel are removed from the cell through conduit 8. The oxidant is admitted to the cell through conduit 9 and waste products and excess oxidant are removed from the cell through conduit 10. Wires 11 and 12 electrically connect the anode and cathode of the cell through an external load 13. External load 13 is some electrically driven device which will produce or work. In the operation of the cell, the compartment 4 is filled with an aqueous solution of a perfluorocarboxylic acid or perfluorosulfonic acid. The perfluoro acids are used in a concentration range of between 5 and 70 wt. percent, preferably, in a concentration range of 20 and 40 wt. percent. The weight percent is based on total weight of the acid and water. The two electrodes, 3 and 5, are composed of an electrically conductive material and a hydrophobic material which has a water contact angle of greater than 85°. Fuel is allowed to enter the cell through conduit 7 and occupy chamber 2 where it contacts one side of the electrode 3. The oxidant is admitted to the cell through conduit 9 where it occupies chamber 6 and contacts one side of electrode 5. By operating the cell in this manner, it is possible to produce a current from liquid hydrocarbons which is not ordinarily possible when utilizing a mineral acid as the electrolyte, since there is inefficient contact between the fuel, the electrolyte and the electrode. Also, in the practice of this invention, the perfluoro acids could be mixed with a mineral acid such as sulfonic or phosphoric. It is also possible to operate the cell by reversing the flow of the fuel and oxidant. That is, the fuel can be admitted through conduit 8 and the oxidant can be admitted through conduit 10.

The perfluoro acids which can be used in the practice of this invention are acids having the formulae: R—SO$_3$H, R$_1$—SO$_3$H, R—R$_1$—SO$_3$H, R—COOH, HOOC—R—COH, and the anhydrides thereof. In the foregoing formulae, R is selected from the group consisting of a C$_2$ to C$_{30}$ completely fluorinated carbon chain and a fluorine saturated cyclic compound. R$_1$ is a C$_6$ to C$_{12}$ unsaturated carbon chain wherein all the hydrogen atoms have been replaced with fluorine.

The following perfluoro acids are representative of those acids which can be used in the practice of this invention: perfluoroacetic, perfluoroproprionic, perfluorobutyric, perfluorocaproic, perfluorocaprylic, perfluoropelargonic, perfluorocapric, perfluorolauric, perfluoromyristic, perfluoropalmitic, perfluoromargaric, perfluorostearic, perfluoroarachidic, perfluorobehenic, perfluoromelissic, perfluoromalonic, perfluorosuccinic, perfluoroglutaric, perfluoroadipic, and the perfluorosulfonic acids such as perfluorobenzenesulfonic, perfluoronaphthalenesulfonic, perfluorododecanebenzenesulfonic, perfluorodecanesulfonic and perfluoropentadecanesulfonic.

The following examples are submitted for the purpose of illustration only and are not to be construed as a limitation upon the scope of the invention as set forth in the appended claims.

EXAMPLE 1

A fuel cell was assembled substantially as set forth in the accompanying drawing. The electrodes were platinized carbon-tetrafluoroethylene. The electrodes were made by impregnating finely divided carbon with platinum, mixing the carbon with tetrafluoroethylene particles and ammonium oxalate particles. The mixture was pressed into shape and heated in order to decompose the ammonium oxalate leaving a porous body comprising platinized carbon and tetrafluoroethylene. The fuel utilized was decane. The cell was operated at 100° C. In the first run, 3.7 M sulfuric acid was utilized as the electrolyte. No detectable current could be drawn from the cell. The 3.7 M sulfuric acid was removed and 30% perfluorobutyric acid was put into the cell and utilized as the electrolyte. A current was produced.

EXAMPLE 2

A fuel electrode was assembled substantially as shown in the drawing. The electrode used was a porous body comprising a mixture of polytetrafluoroethylene and polyacrylonitrile mixed with platinum black. The fuel utilized was decane and the cell was operated at 100° C. When 3.7 M sulfuric acid was used as the electrolyte, a current of about 3.5 amps/ft.$^2$ was produced. However, when 30% perfluorobutyric acid was used, the current density was increased about 300%.

What is claimed is:

1. A fuel cell for anodic oxidation of a fuel, which comprises a container adapted to retain a liquid and being divided into three compartments by an anode and cathode, said anode and cathode being electrically conductive and hydrophobic, space of the compartment between said anode and cathode being filled with an aqueous electrolyte consisting essentially of water and 20 to 40 wt. percent of a saturated perfluoromonocarboxylic acid miscible with water and containing 2 to 6 carbon atoms per molecule.

2. A fuel cell as defined in claim 1 in which the perfluorocarboxylic acid is selected from the group consisting of perfluoroacetic, perfluoropropionic, perfluorobutyric, and perfluorocaproic acids.

References Cited

UNITED STATES PATENTS

| | | | |
|---|---|---|---|
| 2,857,295 | 10/1958 | Brown | 136—154 |
| 3,125,468 | 3/1964 | Thompson et al. | 136—86 |
| 3,258,364 | 6/1966 | Worsham et al. | 136—86 |

FOREIGN PATENTS

| | | |
|---|---|---|
| 758,467 | 1/1954 | Great Britain. |

OTHER REFERENCES

Industrial and Engineering Chemistry, vol. 43, No. 10, p. 2332–2334.

WINSTON A. DOUGLAS, *Primary Examiner.*

H. FEELEY, *Assistant Examiner.*